3,646,161
SYNTHETIC RUBBER MIXTURES OF BUTADIENE/ STYRENE BLOCK COPOLYMERS
Gunter Marwede and Gottfried Pampus, Leverkusen, and Martin Hoffmann, Bergisch-Gladbach, Germany, assignors to Farbenfabriken Bayer Aktiengesellschaft, Leverkusen, Germany
No Drawing. Filed May 8, 1969, Ser. No. 823,187
Claims priority, application Germany, May 14, 1968,
P 17 70 407.3
Int. Cl. C08f 29/12, 33/08
U.S. Cl. 260—876 B                                        4 Claims

ABSTRACT OF THE DISCLOSURE

Synthetic rubber mixture comprising:
(a) from 10% to 90% by weight of one or more uniform butadiene/styrene block copolymers with a molecular weight of from 30,000 to 150,000, a viscosity $[\eta]$ measured in toluene of from 0.5 to 2 dl./g. and a styrene content of from 20% to 50% by weight; and
(b) from 90% to 10% by weight of one or more uniform butadiene/styrene block copolymers with a molecular weight of from 100,000 to 1,000,000, a viscosity $[\eta]$ measured in toluene of from 1.5 to 10 dl./g. and a styrene content of from 0.3 to 20% by weight.

---

It is known that blends of emulsion butadiene/styrene copolymers (E–SBR) with polystyrene resins are frequently used in the production of hard moulded articles. In addition to the requisite hardness, vulcanisates of these products also show outstanding strength properties. Unfortunately, considerable difficulties are involved in preparing blends in E–SBR with polystyrene resins. If they are to show optimum properties, the blends can usually only be prepared at relatively high temperatures, i.e. by applying the hot-mixing process at $\cong 150°$ C. Another disadvantage affecting the preparation of mixtures such as these is that, due to that E–SBR component, strong relaxation forces are active giving rise to shrinkage or swelling, for example, in the production of mouldings. Vulcanisates of these blends have the disadvantages that, firstly E–SBR and homopolystyrene are not compatible with one another so that it is impossible to produce either transparent or translucent mouldings, and, secondly, the mouldings behave like thermoplasts at temperatures as low at 60° C. due to the incompatible homopolystyrene which cannot be co-vulcanised. This gives rise to undesired deformation of the products.

Recently, it has been proposed to use butadiene/styrene block copolymers polymerised from solution with organo-lithium compounds, instead of the E–SBR/polystyrene resin blends for the production of hard commercial products. These block copolymers, which consist of molecules with one butadiene and one styrene segment each, have better processing properties and yield transparent vulcanisates as compared to the blends. Unfortunately, the butadiene/styrene block polymers usually showed inadequate green strength. Vulcanisates of butadiene/styrene block copolymers also are thermoplastic which is reflected in a dractic reduction in hardness at elevated temperatures and in an unfavourable, i.e. too high compression set. The compression set may exceed 80% when measured under constant deformation (ASTM–D 395–61, Method B) for 22 hours at 70° C. It is thus clear that both the E–SBR/polystyrene resin blends and the butadiene/styrene block copolymers prepared in solution by known methods possess only limited applicability.

The present invention relates to synthetic rubber mixtures comprising:
(a) 10 to 90% by weight of one or more uniform butadiene/styrene block copolymers with a molecular weight of from 30,000 to 150,00, a viscosity $[\eta]$ measured in toluene of from 0.5 to 2 dl./g. and a styrene content of from 20 to 50% by weight; and
(b) 90 to 10% by weight of one or more uniform butadiene/styrene block copolymers with a molecular weight of from 100,000 to 1,000,000, a viscosity $[\eta]$ measured in toluene of from 1.5 to 10 dl./g. and a styrene content of from 0.3 to 20% by weight, the styrene blocks having a molecular weight of at least 3000.

These synthetic rubber mixtures may contain the additives normally used for rubber, such as pigments and fillers. They may be vulcanised by the usual methods with the assistance of vulcanising agents and vulcanisation accelerators.

The polymer mixtures according to the invention may be prepared by mixing in solution at least two separately prepared polymers which satisfy the requirements stipulated above, and then isolating the polymer mixture in known manner, for example, by steam distillation. The two polymers may also be converted individually into polymer crumbs from the solution by steam distillation. These polymer crumbs may then be mixed in the required ratio and processed, for example in a screw extruder.

It is also possible to obtain suitable polymer mixtures by producing butadiene/styrene block copolymers with staggered addition of the monomers, and deactivating part of the growing polymer chains either before or during the addition of the other monomer so that the freshly added monomer can only grow on to a fraction of the polymer molecules. In this way, it is possible to obtain polymer mixtures of the composition according to the invention in one polymerisation batch. The basic polymers from which the polymer mixtures according to the invention are made should contain at least 70%, and preferably about 90%, of the total amount of styrene present in the form of blocks with a molecular weight of more than 3000. Several styrene blocks per molecule may be present in the two basic polymers.

Block copolymers with several styrene blocks can be prepared by the staggered addition of monomers during polymerisation and also by subsequent coupling of polymer molecules with reactive halogen compounds, such as, for example, dimethyl dichlorosilane, silicon tetrachloride, methylene bromide, phosphorus trichloride or divinyl benzene, according to known methods. The ratio in which the basic polymers are mixed according to the invention may be varied within wide limits. However, at least 10, and at the most 90%, by weight of each basic polymer should be present in the mixture. The Mooney value (ML4') of the mixture is preferably between 30 and 70 and its styrene block content should be between 10 and 40% by weight.

In particular, the styrene/butadiene block copolymers (a) and (b) may be prepared in accordance with German Auslegescrift No. 1,087,809. To prepare copolymer (a), it is preferred to use from 2.5 to 5.0 mmol of the organo-lithium compound for 100 g. of the monomers.

Polymerisation is preferably carried out in a hydrocarbon solvent, an alkyl lithium such as butyl lithium, amyl lithium, ethyl lithium or methyl lithium, being preferably used as the organo-lithium compound. Copolymer (b) is prepared in the same way as copolymer (a) except that the quantity in which the catalyst is used is reduced to 0.25 to 2.5 mmol of organo-lithium compound per 100 g. of the monomers. As already mentioned, it is also possible to prepare both copolymers together by staggered addition of the monomers. For this purpose, polymerisation is initially carried out in the same way as for copolymer (a), except that it is interrupted before completion by deactivating some of the catalyst respectively some of the already formed still polymerisable chains (for example, with H-acid compounds such as alcohols or oxygen), adding further monomer an then continuing polymerisation to completion. This procedure effects a reduction in the catalyst concentration during the second stage of polymerisation so that both, polymers of type (a) and of type (b), are produced simultaneously.

Preferably, from 80 to 20% of the polymer chains present are deactivated at the end of the first stage of polymerisation.

Technological testing has shown that vulcanisates containing these new block copolymers prepared in accordance with the invention show considerable advantages over the aforementioned E–SBR/polystyrene resin blends in their processing properties. On the other hand, there is no need to apply a hot-mixing process and, on the other hand, no relaxation forces which would otherwise give rise to shrinkage or swelling are observed. Furthermore, transparent vulcanisates can be obtained. Compared with 2-segment butadiene/styrene block copolymers prepared by known methods, the block polymers according to the invention are far less thermoplastic at elevated temperatures, for example, they show a smaller reduction in hardness and a distinctly improved, that is to say smaller, compression set.

Mixtures obtained by the process of the invention are particularly suitable for the production of hard mouldings. They may contain fillers such as, for example, precipitated highly active silica, inactive silica, natural and synthetic silicates, carbonates, sulphates or carbon blacks of different levels of activity, plasticisers and vulcanisation auxiliaries.

The invention is illustrated by the following examples.

EXAMPLE 1

Preparation of polymer mixture C (a) 85 mmol of lithium butyl are added to a mixture of 20 litres of benzene, 2 kg. of butadiene and 500 g. of styrene with a water content of 3.0 p.p.m. After 4 hours' polymerisation at 50° C., the solution was stopped and stabilised by the addition of 25 g. of 4-methyl-2,6-ditert.butyl henol and 25 g. of stearic acid. The polymer has a Mooney value ML4'/100° C. of 30.

(b) 90 mmol of lithium butyl were added to a mixture of 20 litres of benzene and 500 g. of styrene, and polymerisation was continued for 1.5 hours at 50° C. until all the styrene had been reacted. 2 kg. of butadiene containing 6 p.p.m. of water were then added and polymerisation was completed. The polymerisation mixture was stopped and stabilised as in ste (a) above. The product had a Mooney value ML4' of 120.

5 parts of the polymer solution according to step (a) and 1 part of the polymer solution according to step (b) were thoroughly mixed and converted by steam distillation into rubber crumbs; ML4' after drying: 43.

EXAMPLE 2

Preparation of polymer mixture D (a) A butadiene/styrene block copolymer containing 25% by weight of styrene was prepared in accordance with Example 1(a). This block polymer had a Mooney value of 30.

(b) A styrene/butadiene block copolymer containing 15% by weight of styrene was prepared as described in Example 1(b). This block polymer had a Mooney value of 130.

6 parts of polymer solution (a) were mixed with 1 part of polymer solution (b), and the resulting mixture was worked up as described in Example 1. The Mooney value after drying was 41.

EXAMPLE 3

Preparation of polymer mixture E 75 mmol of lithium butyl were added to a mixture of 20 litres of benzene, 1 kg. of butadiene and 500 g. of styrene. On completion of polymerisation, 1 kg. of butadiene containing 10 p.p.m. of water was added. Addition of the butadiene deactivated about 30% of all the active chains. Accordingly, a polymer mixture of a butadiene/styrene copolymer and a butadiene/styrene/butadiene copolymer was obtained on completion of polymerisation. The product had a Mooney value of 37.

EXAMPLE 4

Preparation of polymer mixture F

A solvent/monomer mixture according to Example 3 was polymerized with 83 mmol of lithium butyl. Following the addition of 1 kg. of butadiene, approximately 50% of all the active chains were deactivated. The end product had a Mooney value of 34.

EXAMPLE 5

Preparation of polymer mixtures G and H 150 g. of styrene were polymerised with 80 mmol of lithium butyl in the presence of 320 mmol of tetrahydrofuran in 15 litres of benzene as the solvent. On completion of the reaction, 450 g. of butadiene were added. 120 g. of styrene, 700 g. of butadiene, 120 g. of styrene and finally another 700 g. of butadiene were then alternately added in each case on completion of the reaction. The H-acid compound content of the last four monomer batches was adjusted in such a way that approximately 20% of the active chains were deactivated. After stabilisation and working-up in accordance with Example 1, the polymer mixture had a Mooney value of 44. In a repetition of the same test, the quantity of catalyst was reduced to 70 mmol. The resulting polymer mixture (H) had a similar composition. Mooney value: 62.

EXAMPLE 6

Preparation of polymer mixtures I and K

Polymerisation was initially carried out with 85 mmol of lithium butyl in exactly the same way as described in Example 3. On completion of polymerisation but before stopping, 14 g. of dry divinyl benzene were added and the reaction mixture was held for another 4 hours at 50° C. As a result of the subsequent branching with divinyl benzene, the Mooney value rose from 8 to 47, and the end product was a polymer mixture consisting of a butadiene/styrene block polymer and different multiblock polymers with a star-like structure.

This test was repeated that, on completion of polymerisation but before stopping, the polymerisation mixture was cross-linked with 12 mmol of $SiCl_4$. This represents a stoichiometric excess of about 25%, based on the still active chains. The Mooney value is thus increased from about 4 to 43, and a polymer mixture consisting of a butadiene/styrene block copolymer and multi-block polymers with twice, three times and four times the molecular weight, is obtained as the end product.

The mixtures specified in the table were prepared and tested by known methods. The parts indicated in the table are parts by weight. Example A is an emulsion butadiene/styrene/ high styrene resin 80:20 blend, whilst Example B is a 2-segment butadiene/styrene block copolymer.

|  | A | B | C | D | E | F | G | H | I | K |
|---|---|---|---|---|---|---|---|---|---|---|
| Polymer | 100 | 100 | 100 | 100 | 100 | 100 | 100 | 100 | 100 | 100 |
| Zinc oxide | 2 | 2 | 2 | 2 | 2 | 2 | 2 | 2 | 2 | 2 |
| Stearic acid | 4 | 4 | 4 | 4 | 4 | 4 | 4 | 4 | 4 | 4 |
| Naphthenic mineral oil | 5 | 5 | 5 | 5 | 5 | 5 | 5 | 5 | 5 | 5 |
| Highly active silica | 50 | 50 | 50 | 50 | 50 | 50 | 50 | 50 | 50 | 50 |
| Dibenzothiazyl disulphide | 1 | 1 | 1 | 1 | 1 | 1 | 1 | 1 | 1 | 1 |
| Diphenyl guanidine | 0.8 | 0.8 | 0.8 | 0.8 | 0.8 | 0.8 | 0.8 | 0.8 | 0.8 | 0.8 |
| Tetramethylthiuram disulphide | 0.4 | 0.4 | 0.4 | 0.4 | 0.4 | 0.4 | 0.4 | 0.4 | 0.4 | 0.4 |
| Sulphur | 1.6 | 1.6 | 1.6 | 1.6 | 1.6 | 1.6 | 1.6 | 1.6 | 1.6 | 1.6 |
| Processing[1] | 2 | 2 | 2 | 2 | 2 | 2 | 2 | 2 | 2 | 2 |
| Mooney viscosity of the mixture ML4'/100° C | 147 | 120 | 124 | 95 | 106 | 108 | 80 | 120 | 110 | 100 |
| Relaxation (percent after 24 hours) | 25 | 0 | 0 | 0 | 0 | 0 | 0 | 0 | 0 | 0 |
| Vulcanisation at 151° C. (mins.) | 30 | 30 | 30 | 30 | 30 | 30 | 30 | 30 | 30 | 30 |
| Shock elasticity at 20/75° C. according to DIN 53512 | 35/29 | 39/33 | 41/36 | 41/36 | 39/34 | 39/36 | 38/39 | 40/41 | 42/40 | 41/41 |
| Hardness (Shore A) according to DIN 53512 at: |  |  |  |  |  |  |  |  |  |  |
| 20° C | 91 | 90 | 86 | 85 | 83 | 82 | 76 | 75 | 76 | 77 |
| 75° C | 72 | 68 | 70 | 72 | 65 | 64 | 60 | 60 | 65 | 63 |
| 100° C | 65 | 58 | 65 | 64 | 60 | 60 | 57 | 59 | 62 | 62 |
| 125° C | 60 | 50 | 64 | 64 | 59 | 59 | 55 | 59 | 61 | 60 |
| Pressure forming residue under constant forming (percent) according to ASTM-D 395-61; 22 hours at: |  |  |  |  |  |  |  |  |  |  |
| 20° C | 51 | 79 | 38 | 38 | 43 | 40 | 41 | 42 | 32 | 29 |
| 70° C | 53 | 95 | 45 | 43 | 53 | 45 | 41 | 29 | 30 | 31 |
| 100° C | 66 | 98 | 49 | 45 | 65 | 55 | 65 | 51 | 46 | 51 |

[1] Processing assessment: 1=very good; 5=poor.

We claim:

1. A synthetic rubber mixture wherein the rubber components consist of (a) from 10% to 90% by weight of one or more uniform butadiene/styrene block copolymers with a molecular weight of from 30,000 to 150,000, a viscosity $[\eta]$ measured in toluene of from 0.5 to 2 dl./g. and a styrene content of from 20% to 50% by weight and (b) from 90% to 10% by weight of one or more uniform butadiene/styrene block copolymers with a molecular weight of from 100,000 to 1,000,000, a viscosity $[\eta]$ measured in toluene of from 1.5 to 10 dl./g. and a styrene content of from 0.3 to 20% by weight, the styrene blocks having a molecular weight of at least 3,000, said (a) and (b) being different block copolymers.

2. The synthetic rubber mixture of claim 1 wherein the Mooney value (ML 4') of said mixture is between 30 and 70.

3. The synthetic rubber mixture of claim 1 wherein the styrene block content of said mixture is between 10 and 40% by weight thereof.

4. A process for producing a synthetic rubber mixture which comprises polymerizing styrene and butadiene in an inert solvent using from 2.5 to 5 mmol of an organolithium compound per 100 gm. of monomers as a catalyst, deactivating 20 to 80% of the catalyst prior to completion of the polymerization, adding additional styrene and completing the polymerization.

References Cited

UNITED STATES PATENTS

| | | | |
|---|---|---|---|
| 3,265,765 | 8/1966 | Holden et al. | 260—876 |
| 3,322,856 | 5/1967 | Holden et al. | 260—876 |
| 3,352,944 | 11/1967 | Wheat | 260—876 |
| 3,476,829 | 11/1969 | Gruver et al. | 260—876 |
| 3,519,585 | 7/1970 | Miller | 260—876 |

SAMUEL H. BLECH, Primary Examiner

U.S. Cl. X.R.

260—41.5 R, 41.5 A, 880 B